(12) United States Patent
Rodine

(10) Patent No.: US 11,993,168 B2
(45) Date of Patent: May 28, 2024

(54) EV OPERATOR SPECIFIC PARAMETER(S) COMMUNICATED BETWEEN PEV AND EVSE

(71) Applicant: ChargePoint, Inc., Campbell, CA (US)

(72) Inventor: Craig Rodine, San Jose, CA (US)

(73) Assignee: CHARGEPOINT, INC., Campbell, CA (US)

( * ) Notice: Subject to any disclaimer, the term of this patent is extended or adjusted under 35 U.S.C. 154(b) by 1221 days.

(21) Appl. No.: 16/572,086

(22) Filed: Sep. 16, 2019

(65) Prior Publication Data

US 2020/0009979 A1    Jan. 9, 2020

Related U.S. Application Data

(63) Continuation of application No. 15/136,849, filed on Apr. 22, 2016, now Pat. No. 10,414,281.

(60) Provisional application No. 62/152,751, filed on Apr. 24, 2015.

(51) Int. Cl.
| | |
|---|---|
| *H04W 4/80* | (2018.01) |
| *B60L 53/60* | (2019.01) |
| *B60L 53/62* | (2019.01) |
| *B60L 53/65* | (2019.01) |
| *B60L 53/66* | (2019.01) |
| *B60L 53/68* | (2019.01) |
| *G06F 21/62* | (2013.01) |
| *H04W 4/40* | (2018.01) |

(52) U.S. Cl.
CPC ............ *B60L 53/62* (2019.02); *B60L 53/60* (2019.02); *B60L 53/65* (2019.02); *B60L 53/66* (2019.02); *B60L 53/68* (2019.02); *G06F 21/629* (2013.01); *H04W 4/40* (2018.02); *H04W 4/80* (2018.02); *Y02T 90/12* (2013.01)

(58) Field of Classification Search
CPC .......... B60L 53/62; B60L 53/60; B60L 53/65; B60L 53/66; B60L 53/68; Y02T 90/12; Y02T 10/70; Y02T 10/7072; Y02T 90/14; Y02T 90/16; Y02T 90/167; G06F 21/629; H04W 4/40; H04W 4/80; Y04S 30/12
USPC ........................................................ 320/109
See application file for complete search history.

(56) References Cited

U.S. PATENT DOCUMENTS

| | | | |
|---|---|---|---|
| 8,890,475 B1 * | 11/2014 | Becker | ................... B60L 53/66 320/109 |
| 9,371,007 B1 * | 6/2016 | Penilla | ............... G06Q 30/0259 |
| 9,545,853 B1 * | 1/2017 | Penilla | ..................... H02J 7/00 |

(Continued)

OTHER PUBLICATIONS

Final Rejection dated Jul. 5, 2018 for U.S. Appl. No. 15/136,849.

(Continued)

*Primary Examiner* — Stacy Whitmore
(74) *Attorney, Agent, or Firm* — NICHOLSON DE VOS WEBSTER & ELLIOTT LLP

(57) ABSTRACT

An electric vehicle supply equipment (EVSE) receives, from an electric vehicle (EV) connected to the EVSE, one or more electric vehicle (EV) operator-specific parameters that are specific to an EV operator, where the one or more EV operator-specific parameters affect charging service for the EV at the EVSE, and where the one or more EV operator-specific parameters are received automatically as a result of the EV being connected to the EVSE. The EVSE applies the one or more EV operator-specific parameters.

21 Claims, 4 Drawing Sheets

(56) References Cited

U.S. PATENT DOCUMENTS

| | | | |
|---|---|---|---|
| 2010/0211643 A1* | 8/2010 | Lowenthal | B60L 53/14 709/206 |
| 2011/0140835 A1* | 6/2011 | Ishibashi | B60L 53/68 340/5.2 |
| 2013/0046660 A1* | 2/2013 | Lowenthal | G06Q 30/04 705/30 |
| 2013/0179061 A1* | 7/2013 | Gadh | B60L 53/63 701/1 |
| 2015/0202975 A1* | 7/2015 | Solomon | G06Q 10/06316 705/7.26 |
| 2017/0024552 A1* | 1/2017 | Rodine | B60L 53/60 |
| 2018/0345810 A1* | 12/2018 | Shuaib | H04L 9/3247 |
| 2020/0134742 A1* | 4/2020 | Turner | G06Q 20/40145 |
| 2022/0144120 A1* | 5/2022 | Feldman | B60L 53/14 |

OTHER PUBLICATIONS

Non-Final Rejection dated Dec. 13, 2018 for U.S. Appl. No. 15/136,849.
Non-Final Rejection dated Jan. 24, 2018 for U.S. Appl. No. 15/136,849.
Notice of Allowance and Fees Due (PTOL-85) dated May 6, 2019 for U.S. Appl. No. 15/136,849.

* cited by examiner

EV OPERATOR SPECIFIC PARAMETER(S) COMMUNICATED BETWEEN PEV AND EVSE

CROSS-REFERENCE TO RELATED APPLICATIONS

This application is a continuation of U.S. application Ser. No. 15/136,849, filed Apr. 22, 2016, which claims the benefit of U.S. Provisional Application No. 62/152,751, filed Apr. 24, 2015, which are all hereby incorporated by reference.

FIELD

Embodiments of the invention relate to the field of charging electric vehicles; and more specifically, to communicating electric vehicle (EV) operator specific parameter (s) between a plug-in electric vehicle (PEV) and electric vehicle supply equipment (EVSE).

BACKGROUND

Electric vehicle supply equipment (EVSE), sometimes referred to as an electric vehicle charging station, is used to charge plug-in electric vehicles (PEVs, such as electric battery powered vehicles, gasoline/electric battery powered vehicle hybrids) (PEV is sometimes referred herein as an electric vehicle (EV)). EVSEs may be located in designated charging locations (e.g., similar to locations of gas stations), adjacent to parking spaces, at residences, etc.

An EV operator may be associated with an account with a Charging Service Provider (CSP) that may have preferences and/or settings that are specific to the EV operator. Example preferences and/or settings include cost/pricing parameter(s) (e.g., the cost of power that the EV operator is willing to pay for electrical energy at various times throughout the week and/or for one or more types of charging service (workplace, public parking, home)), access credentials and/or roaming parameters for "home" and "foreign" CSPs; alerts and notification preferences (e.g., the type and frequency of alerts and notifications concerning a charging session that the driver wishes to receive), etc. These preferences and/or settings may be entered, viewed, and/or managed by the EV operator through a service portal (using a web browser and/or smartphone/tablet app) provided by the EV manufacturer and/or CSP.

PEV specific preferences can be set and/or managed through the PEV's in-cabin (dashboard) user interface. These PEV specific parameters are not EV operator-specific. Therefore, different EV operators with access to the same PEV (e.g., family members or users of a fleet of shared EVs), cannot practically use this method to set or choose different EV operator specific preferences.

Currently, data exchange between the PEV and the EVSE is limited to the parameters related to the embedded control of energy transfer and related safety provisions. Neither PEV-level nor PEV operator-specific parameters can be exchanged between the PEV and EVSE.

SUMMARY

An electric vehicle connected to electric vehicle supply equipment (EVSE) transmits, to the EVSE, EV operator-specific parameters that are specific to an EV operator to the EVSE, where the EV operator-specific parameter(s) affect charging service for the EV at the EVSE, and where the one or more EV operator-specific parameters are received automatically as a result of the EV being connected to the EVSE. The EVSE applies or affects the EV operator-specific parameters appropriately.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

A method and apparatus for communicating EV operator-specific parameters between a PEV to an EVSE is described herein. In one embodiment of the invention, a set of EV operator-specific parameters that can affect the charging services of that EV operator is communicated between the EV and EVSE. This communication may be over a TCP/IP protocol stack (supporting Internet-style packet-based messaging) such as provided by industry standards ISO/IEC 15118 and SAE J2847/J2931. Examples of the EV operator-specific parameters include the cost of power that a driver is willing to pay for electrical energy at various times throughout the week, for each type of charging service (workplace, public parking, home); the driver's access credentials and roaming parameters, for 'home' and 'foreign' Charging Service Providers (CSPs); the type and frequency of alerts and notifications concerning a charging session that the driver wishes to receive; etc.

In one embodiment of the invention, the set of EV operator-specific parameters is communicated to the EVSE automatically upon the EV being connected to the EVSE. The set of EV operator-specific parameters may be communicated across a wired connection and/or a wireless connection. For example, in the case of a wired connection between the EV and the EVSE where typically a charging cable connects the EV and EVSE, the EV operator-specific parameters may be communicated to the EVSE across the charging cable. As another example, a wireless connection may be established between the EV and the EVSE that can be used to communicate the EV operator-specific parameters (which may be required in case of inductive charging).

Figure 1:
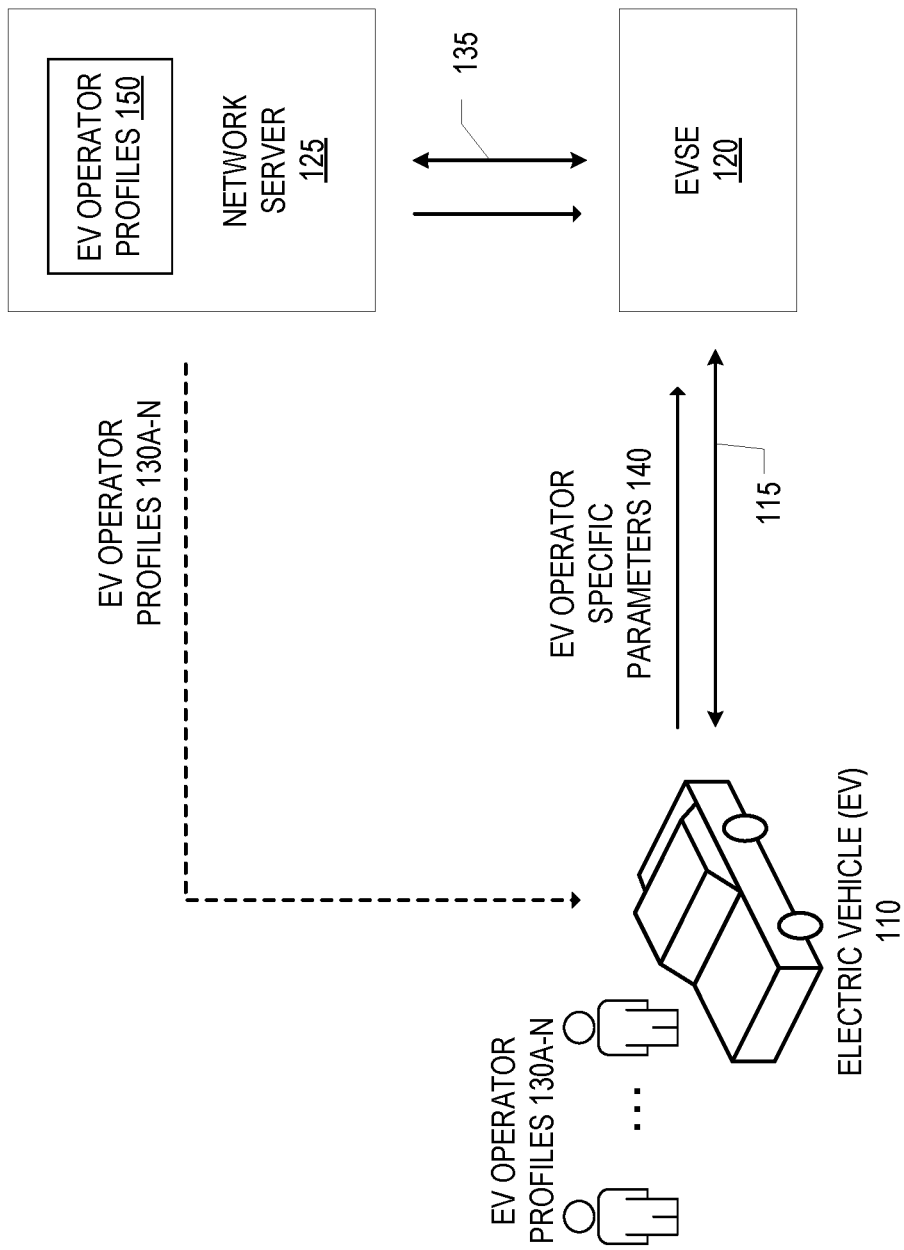
FIG. 1 illustrates an exemplary system where EV operator-specific parameters are communicated between an electric vehicle and an EVSE according to one embodiment.

FIG. 1 illustrates an exemplary system where EV operator-specific parameters are communicated between the EV 110 and the EVSE 120 according to one embodiment. The network server 125, among other things, stores EV operator profiles 150 of EV operators, where each EV operator profile includes one or more preferences and other settings, choices, and/or other parameters that can affect that EV operator's charging services and shape their charging experience. One example of the information that may be included in an EV operator profile is an indication of which offered charging plans (e.g., cost of energy, amount of energy, "renewable only" energy, etc.), in priority order, are to be used at different classes of sites (e.g., business, home, commercial) at different times of days (e.g., work hours, weekday, weekend, etc.), etc., and/or the amount that the EV operator is willing to pay for charging service for those different plans. As an example, at work, the athletic club, any public parking facility, for DC Fast charging, the EV operator is willing to pay up to X dollars for parking at a DC Fast charging spot and up to $Y/mile or /kWh, or up to $Z for charging to W miles range or V % battery charge. Another example of the information that may be included in an EV operator profile is an indication of EV operator-specific credits or discounts (e.g., loyalty discounts) that may be applicable (e.g., 10% discount for using certain EVSEs at certain member locations). Another example of the information that may be included in an EV operator profile is the EV operator's access credentials and/or roaming parameters for "home" and "foreign" Charging Service Providers (CSPs). Another example is the type and frequency of alerts and notifications concerning a charging session that the driver wishes to receive (e.g., battery full; session will be over in X minutes; request to move vehicle, etc.) and notification message contact information (e.g., email address(es), phone number(s), username(s), etc.)

The network server 125 may be owned and/or operated by a CSP. Alternatively, the network server 125 may be owned and/or operated by an EV manufacturer. The information in an EV operator profile may be established through use of a web portal, mobile phone application, dashboard interface in the EV, and/or other interface, by the EV operator and/or on behalf of an EV operator (e.g., a fleet manager may create EV operator profiles for members of the fleet, an employer may create EV operator profiles for its employees, etc.). Certain information in an EV operator profile may be established or created by the CSP and/or EV manufacturer.

The EV operator profiles are communicated to the appropriate electric vehicles specified in the profile. For example, the electric vehicle 110 is associated with the EV operator profiles 130A-N, where N is greater than or equal to 1, and the EV operator profiles 130A-N are communicated to the EV 110 accordingly. By way of example, the EV 110 may be associated with a profile specific to a first EV operator (e.g., a first family member) and another profile specific to a second EV operator (e.g., a second family member). As another example, the EV 110 may be associated with a profile specific to an EV operator's work and another profile specific to the EV operator's personal use. The EV operator profiles 130A-N may be communicated to the EV 110 differently in different embodiments, such as through use of a vehicle telematics link, through use of a paired mobile device, or through other mechanisms.

The EV 110 receives and stores the EV operator profiles 130A-N (e.g., in on-board non-volatile memory such as NAND or NOR flash memory). In one embodiment, the EV 110 is configured to transmit at least some of the information included in the EV operator profiles 130A-N automatically upon successfully connecting to the EVSE 120 and establishing a communication link between the EV 110 and the EVSE 120. Connecting the EV 110 and the EVSE 120 is done differently depending on the type of charging. For example, in case of wired charging, the EV operator connects the EV 110 and the EVSE 120 through use of a charging cable. In the case of inductive charging, typically the EV operator drives their car in proximity with a charging pad, which may automatically trigger a wireless communications session between EV and EVSE; or the EV operator may be required to press a button to connect the EV with the EVSE 120.

In another embodiment, an EV operator profile for an EV operator is made available to an application on a mobile communication device (e.g., a smartphone, a cell phone, a tablet, etc.) that the EV operator can use when requesting charging service. The EV operator profile may be stored locally on the application and/or on the network server 125 and available to the application. As an example, an EV operator may request charging service at the EVSE 120 using the application and the EV operator profile may be then transmitted to the EVSE 120 (e.g., from the mobile communication device itself if the data is stored therein or from the network server 125).

After the EV 110 is connected with the EVSE 120, EV operator-specific parameters 140 are transmitted to the EVSE 120 over the communication link 115. The communication link 115 may be a wired connection and/or a wireless connection. For example, in the case of a wired connection between the EV and the EVSE where typically a charging cable connects the EV and EVSE, the EV operator-specific parameters may be communicated to the EVSE across the charging cable. As another example, a wireless connection may be established between the EV and the EVSE that can be used to communicate the EV operator-specific parameters (which may be required in case of inductive charging). The wireless connection may be a personal area network (PAN) connection such as Bluetooth. The communication link 115 may be compliant with such industry standards as ISO/IEC 15118, and SAE J2847/J2931. A TCP/IP session may be established such that the EVSE 120 (or attached device in the network) assigns an IP address (through DHCP) to the EV 110 and trustworthiness is determined based on certificate chains. As another example, the communication link 115 may use a network connection from a mobile device (e.g., a cell phone, smartphone, tablet, etc.) that may transfer the operator-specific parameters to the EVSE 120.

As previously described, the EV operator-specific parameters may affect the charging services of that EV operator. For example, the EV operator-specific parameters may include access credentials of that EV operator that determine whether the EV operator is allowed to use the EVSE 120 at the time of the request. Upon receiving the EV operator-specific parameters, the EVSE 120 applies or affects those operator-specific parameters accordingly. For example, in the case of receiving access credentials, the EVSE 120 may use those access credentials to determine whether the EV operator is allowed to use the EVSE 120. As another example, if the EV operator-specific parameters includes one or more notification message preferences that define one or more events of interest in which the EV operator wishes to receive a notification message, the EVSE 120 may determine whether, when, and/or where to transmit a notification message upon detecting a notification event of interest based at least on the notification message preferences.

The EVSE 120 may periodically receive other information that may affect the charging service of the EV 110. For example, the EVSE 120 may receive demand response event information (e.g., from a utility supplying energy to the EVSE) and determine whether to act according to the EV operator-specific parameters received from the EV 110. For example, the EV operator-specific parameter may indicate that the EV operator is subject to having their charging service limited and/or shut off during a demand response event (period of high demand), and the EVSE 120 can cause the charging service to act accordingly upon such an event. As another example, the EVSE 120 may receive pricing changes from the network server 125 over the communication link 135.

Figure 2:
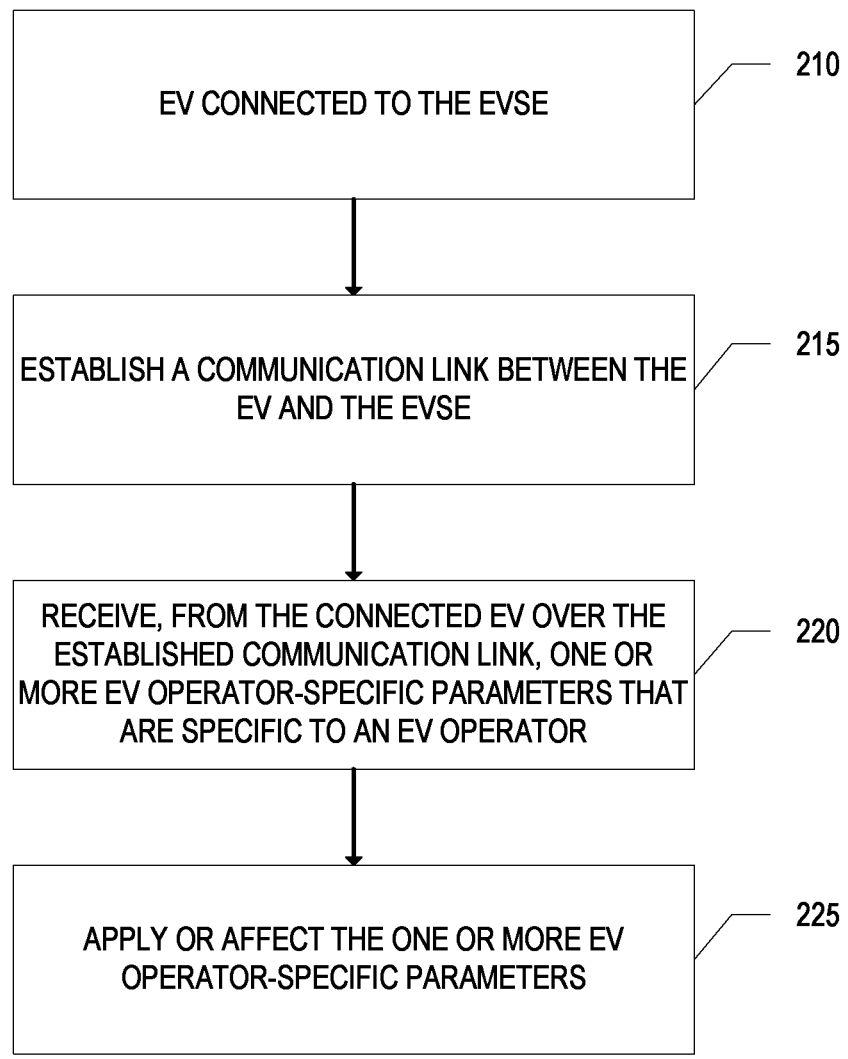
FIG. 2 is a flow diagram that illustrates exemplary operations according to some embodiments of the invention.

FIG. 2 is a flow diagram that illustrates exemplary operations according to some embodiments of the invention. The operations of FIG. 2 will be described with respect to FIG. 1. The electric vehicle 110 is connected to the EVSE 120 at operation 210. As described above, the EV 110 can be connected to the EVSE 120 differently depending on the type of charging supported (e.g., wired charging or wireless charging). Next, at operation 215, the communication link 115 is established between the EV 110 and the EVSE 120.

Next, at operation 220, the EVSE 120 receives, from the connected EV 110 over the communication link 115, one or more EV operator-specific parameters that are specific to an EV operator. In one embodiment, the EV operator-specific parameter(s) are automatically sent to the EVSE 120 (without further EV operator intervention). In another embodiment, the EV operator-specific parameter(s) are sent to the EVSE 120 upon request of the EVSE 120 or the EV operator. For example, the EV operator may be prompted to select a profile to transmit to the EVSE 120 (e.g., on a screen of a mobile application) after connecting to the EVSE 120. In one embodiment, after receiving the EV operator-specific parameters, the EVSE 120 caches the parameters.

In some cases there may be multiple EV operator profiles available on the EV 110 to communicate with the EVSE 120. In one embodiment, each EV operator profile is communicated to the EVSE 120 upon connection of the EV 110. In such an embodiment, the appropriate EV operator profile is selected. For example, the EV operator may be prompted via a mobile application or a screen on the EVSE to select the appropriate EV operator profile.

In another embodiment, an EV operator profile is selected and that selected EV operator is transmitted to the EVSE 120. For example, the EV operator may be prompted to select a profile to transmit to the EVSE 120 (e.g., on a screen of a mobile application) after connecting to the EVSE 120. As another example, the EV 110 may be configured to automatically select the appropriate EV operator profile based on current settings on the EV 110 that are tied to a particular EV operator (e.g., mirror settings, seat position, etc.) and/or based on the car key being used, which may be overridden on the dashboard of the EV 110.

Next, at operation 225, the EVSE 120 applies or affects the one or more EV operator-specific parameters accordingly, as described above. In some embodiments, the EVSE 120 applies the parameters directly. In other embodiments, the EVSE 120 does not apply the parameters directly, but instead interacts with the network server 125 to apply the parameters. By way of example, in the case of access credentials being part of the EV operator-specific parameters, in one embodiment the EVSE 120 receives the access credentials from the EV 110, transmits the access credentials to the network server 125 over the communication link 135, the network server 125 determines using the access credentials whether to allow charging service and communicates the result back to the EVSE 120, and the EVSE 120 allows/denies charging service to the EV 110 accordingly. For instance, the EVSE 120 may include a power control device that energizes a charging port in response to receiving a communication from the network server 125 to allow charging service. As another example, if the EV operator-specific parameters includes one or more notification message preferences that define one or more events of interest in which the EV operator wishes to receive a notification message, the EVSE 120 transmits the access credentials to the network server 125 over the communication link 135 and the network server 125 determines, using the notification message preference(s) whether, when, and/or where to transmit a notification message upon detecting a notification event of interest.

Figure 3:
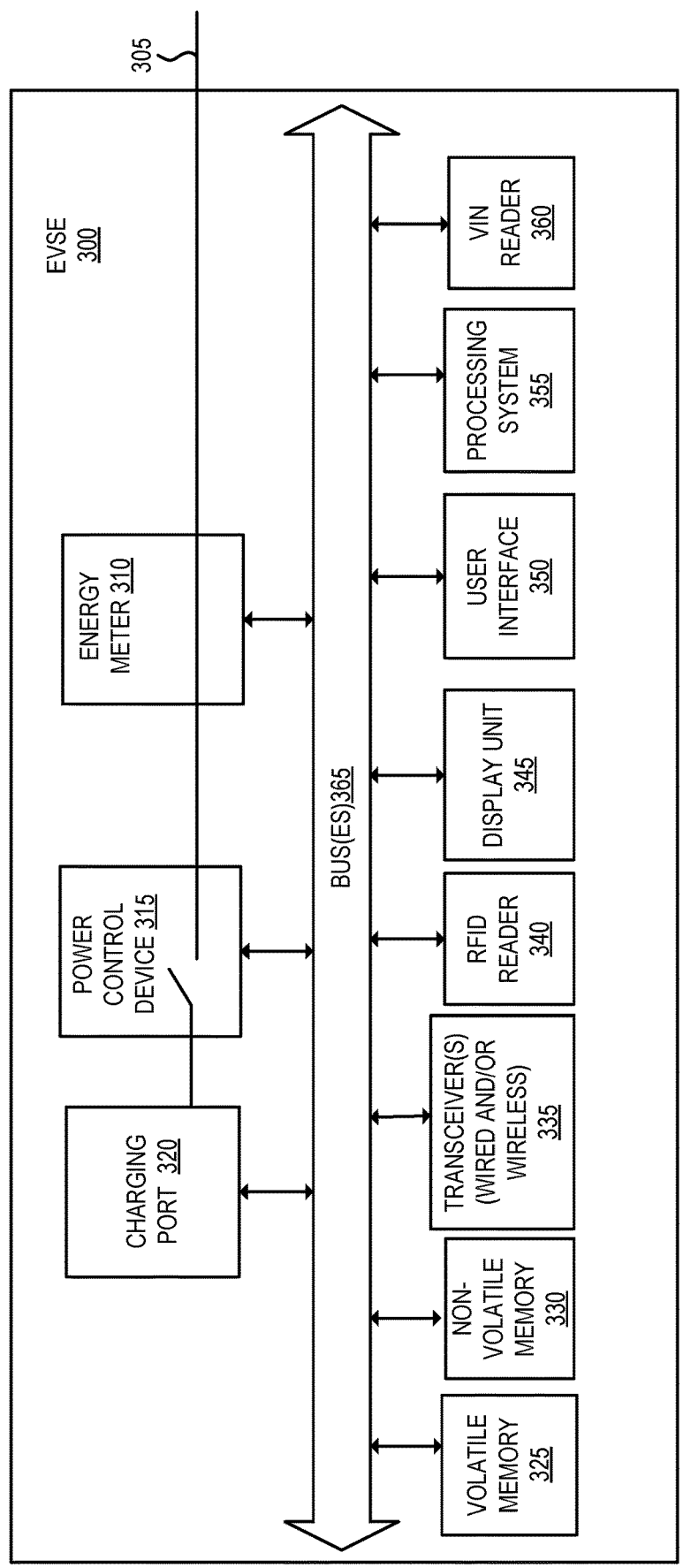
FIG. 3 illustrates an exemplary EVSE according to one embodiment.

FIG. 3 illustrates an exemplary embodiment of an EVSE 300 according to one embodiment. The EVSE 120 may take the form of the EVSE 300. It should be understood that FIG. 3 illustrates an exemplary architecture of an EVSE, and other, different architectures may be used in embodiments described herein. Although several components are illustrated as being included in the EVSE 300, in some embodiments additional, different, or less components may be used in the EVSE 300. For example, some EVSEs may not include a display, a user interface, an RFID reader, and/or a VIN reader.

As illustrated in FIG. 3, the EVSE 300 includes the energy meter 310, the power control device 315, the charging port 320, the volatile memory 325, the non-volatile memory 330 (e.g., hard drive, flash, PCM, etc.), one or more transceiver(s) 335 (e.g., wired transceiver(s) (e.g., Ethernet, power line communication (PLC), etc.) and/or wireless transceiver(s) (e.g., 802.15.4 (e.g., ZigBee, etc.), Bluetooth, WiFi, Infrared, GPRS/GSM, CDMA, etc.)), the RFID reader 340, the display unit 345, the user interface 350, the processing system 355 (e.g., one or more microprocessors and/or a system on an integrated circuit), and the VIN reader 360, which are coupled with one or more buses 365.

The energy meter 310 measures the amount of electricity that is flowing on the power line 305 through the charging port 320. While in one embodiment the energy meter 310 measures current flow, in an alternative embodiment the energy meter 310 measures power draw. The energy meter 310 may be an induction coil or other devices suitable for measuring electricity. In some embodiments, the energy meter 310 is a programmable time of use energy meter (e.g., programmed according to the prices and time periods defined by its host). While the energy meter 310 is illustrated as being included within the EVSE 300, in other embodiments the energy meter 310 is exterior to the EVSE 300 but capable of measuring the amount of electricity flowing on the power line 305 through the charging port 320.

The charging port 320 is a power receptacle, circuitry for an attached charging cord (e.g., with a SAE J1772 connector), or circuitry for inductive charging. While FIG. 3 illustrates a single charging port 320, the EVSE 300 may include multiple charging ports that may be of different types.

The power control device 315 is a solid-state device that is used to control the current flowing on the power line 305 or any other device suitable for controlling the current flowing on the power line 305. The power control device 315 may be a set of contactors or relays. In some embodiments the power control device 315 energizes the charging port 320 (e.g., by completing the circuit to the power line 305) or de-energizes the charging port 320 (e.g., by breaking the circuit to the power line 305). In some embodiments the power control device 315 energizes the charging port 320 responsive to a determination that charging service is authorized for the charging port 320 (e.g., in response to receiving a communication from the network server 125 to allow charging service).

The RFID reader 340 reads RFID tags from RFID enabled devices (e.g., smartcards, key fobs, contactless credit cards, etc.), embedded with RFID tag(s) of operators that want to use the charging port 320 of the EVSE 300. For example, in some embodiments a vehicle operator can wave/swipe an RFID enabled device near the RFID reader 340 to provide an identifier or access credentials for use of the charging port 320. The RFID identifier may be associated with an electric vehicle. For example, each electric vehicle of a fleet may have an associated RFID enabled device (e.g., smartcard, key fobs, etc.) configured with the unique identifier of the electric vehicle that an operator can wave/swipe near the RFID reader to provide the identifier of the electric vehicle to the EVSE. The vehicle identifier may be transmitted to a server network for identification of the operator who swiped the RFID enabled device. Electric vehicle operators may use the RFID reader 340 for payment. In addition to an RFID reader, the EVSE 300 may also include a credit card reader.

The transceiver(s) 335 transmit and receive messages. For example, the transceiver(s) 335 may transmit the set of EV operator-specific parameters to the network server 125. The transceiver(s) 335 may receive a message from the network server 125 to allow charging service or deny charging service.

The display unit 345 is used to display messages to vehicle operators including charging status, confirmation messages, error messages, notification messages, etc. The display unit 345 may also display parking information if the EVSE 300 is also acting as a parking meter (e.g., amount of time remaining in minutes, parking violation, etc.).

The user interface 350 allows users to interact with the EVSE 300. By way of example, the user interface 350 allows electric vehicle operators to present user identifiers, be placed in a queue for the charging port 320, enter in account and/or payment information, etc.

The processing system 355 may retrieve instruction(s) from the volatile memory 325 and/or the non-volatile memory 330, and execute the instructions to perform operations as previously described herein. The VIN reader 360 reads an identifier of an electric vehicle such as the VIN of the electric vehicle.

Figure 4:
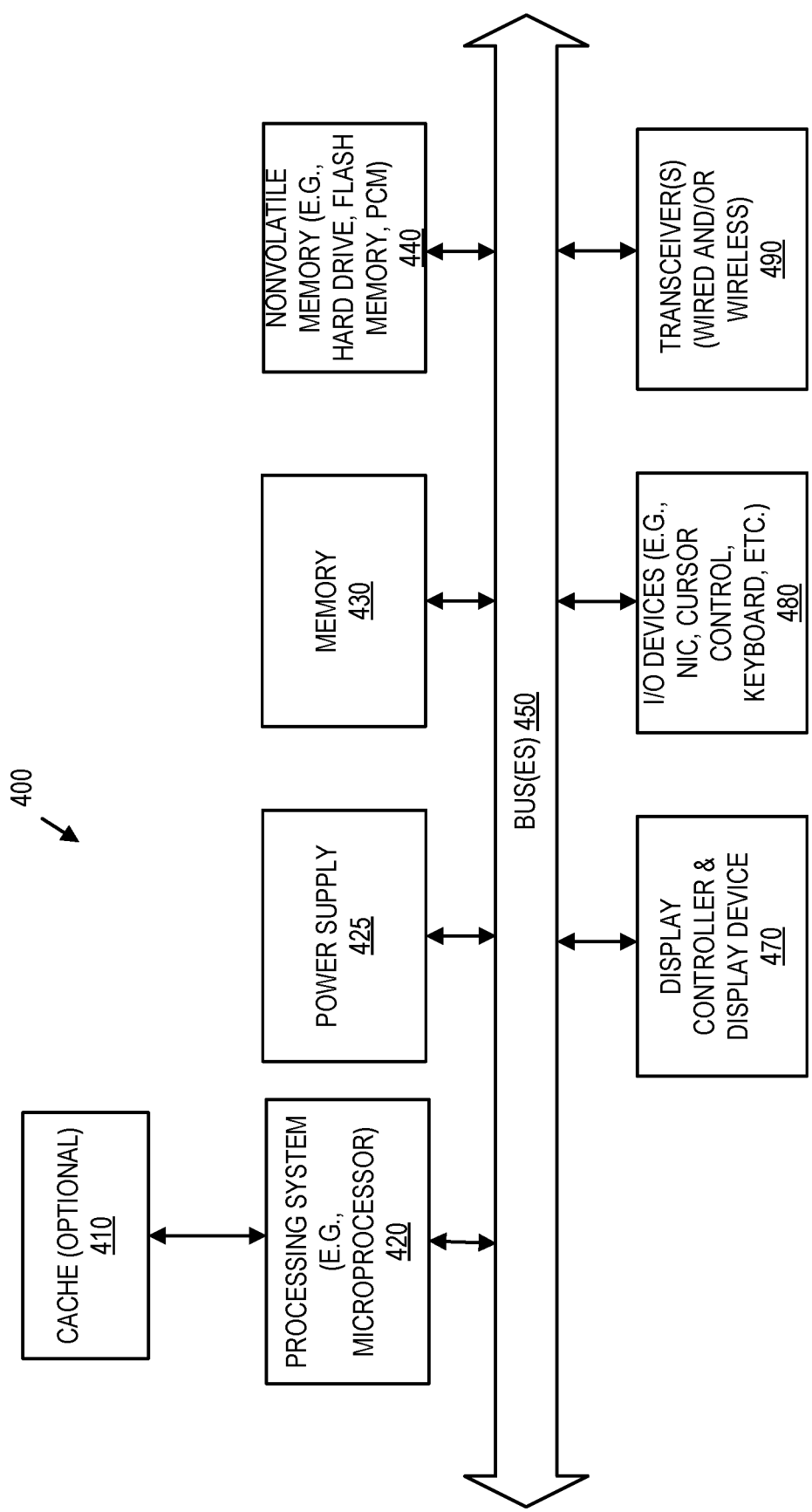
FIG. 4 is a block diagram illustrating an exemplary architecture of a data processing system that may be used in some embodiments.

FIG. 4 is a block diagram illustrating an exemplary architecture of a data processing system that may be used in some embodiments. It should be understood that while FIG. 4 illustrates various components of a data processing system, it is not intended to represent any particular architecture or manner of interconnecting the components as such details are not germane to the present invention. The network server 125 may use an architecture similar to the architecture of the data processing system illustrated in FIG. 4. However, it should be appreciated that the network server 125 may use a different data processing system than the data processing system 400 or may have fewer, less, more, or different components than the data processing system 400.

As illustrated in FIG. 4, the data processing system 400, which is a form of a computing device, includes the bus(es) 450 which is coupled with the processing system 420, power supply 425, memory 430, and the nonvolatile memory 440 (e.g., a hard drive, flash memory, Phase-Change Memory (PCM), etc.). The bus(es) 450 may be connected to each other through various bridges, controllers, and/or adapters as is well known in the art. The processing system 420 may retrieve instruction(s) from the memory 430 and/or the nonvolatile memory 440, and execute the instructions to perform operations as described above. The bus 450 interconnects the above components together and also interconnects those components to the display controller & display device 470, Input/Output device(s) 480 (e.g., NIC (Network Interface Card), a cursor control (e.g., mouse, touchscreen, touchpad, etc.), a keyboard, etc.), and the transceiver(s) 490 (wired transceiver(s) (e.g., Ethernet, power line communication (PLC), etc.) and/or wireless transceiver(s) (e.g., 802.15.4 (e.g., ZigBee, etc.), Bluetooth, WiFi, Infrared, GPRS/GSM, CDMA, RFID, etc.)).

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., a network server, an EVSE). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer-readable communication media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory computer-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method in an electric vehicle supply equipment (EVSE), comprising:
   receiving, at the EVSE from an electric vehicle (EV) connected to the EVSE, one or more electric vehicle (EV) operator-specific parameters that are specific to an EV operator, wherein the one or more EV operator-specific parameters affect charging service for the EV at the EVSE, wherein the one or more EV operator-specific parameters are received automatically as a result of the EV being connected to the EVSE, and wherein the one or more EV operator-specific parameters includes pricing parameters for the charging service; and
   applying the one or more EV operator-specific parameters to affect the charging service for the EV at the EVSE, wherein applying the one or more EV operator-specific parameters includes the following:
      determining, from the pricing parameters, a rate the EV operator is willing to pay for the charging service.

2. The method of claim 1, wherein the rate the EV operator is willing to pay for the charging service is determined based at least on one of the following: a location of the EVSE, a time of the charging service, and a day of the charging service.

3. The method of claim 1, wherein the pricing parameters include charging plans based on classes of sites of the EVSE and times of day.

4. The method of claim 1, wherein the rate the EV operator is willing to pay is an amount per mile, an amount per unit of electrical energy, an amount for a particular miles range, or an amount for a specified percentage of battery charge.

5. The method of claim 1, wherein the one or more EV operator-specific parameters are received from the EV over a communication link that is wired.

6. The method of claim 5, wherein the communication link is across a charging cable that couples the EV and the EVSE.

7. The method of claim 1, wherein the one or more EV operator-specific parameters are received from the EV over a communication link that is wireless.

8. An electric vehicle supply equipment (EVSE), comprising:
   a processor; and
   a non-transitory computer-readable storage medium that provides instructions that, when executed by the processor, causes said processor to perform the following operations:
      receive, at the EVSE from an electric vehicle (EV) connected to the EVSE, one or more EV operator-specific parameters that are specific to an EV operator, wherein the one or more EV operator-specific parameters affect charging service for the EV at the EVSE, wherein the one or more EV operator-specific parameters are received automatically as a result of the EV being connected to the EVSE, and wherein the one or more EV operator-specific parameters includes pricing parameters for the charging service, and
      apply the one or more EV operator-specific parameters to affect the charging service for the EV at the EVSE, wherein applying the one or more EV operator-specific parameters includes causing said processor to:
         determine, from the pricing parameters, a rate the EV operator is willing to pay for the charging service.

9. The EVSE of claim 8, wherein the rate the EV operator is willing to pay for the charging service is determined based at least on one of the following: a location of the EVSE, a time of the charging service, and a day of the charging service.

10. The EVSE of claim 8, wherein the pricing parameters include charging plans based on classes of sites of the EVSE and times of day.

11. The EVSE of claim 8, wherein the rate the EV operator is willing to pay is an amount per mile, an amount per unit of electrical energy, an amount for a particular miles range, or an amount for a specified percentage of battery charge.

12. The EVSE of claim 8, wherein the one or more EV operator-specific parameters are received from the EV over a communication link that is wired.

13. The EVSE of claim 12, wherein the communication link is across a charging cable that couples the EV and the EVSE.

14. The EVSE of claim 8, wherein the one or more EV operator-specific parameters are received from the EV over a communication link that is wireless.

15. A non-transitory computer-readable storage medium of an electric vehicle supply equipment (EVSE) that provides instructions that, when executed by a processor of the EVSE, will cause the EVSE to perform operations comprising:
   receiving, at the EVSE from an electric vehicle (EV) connected to the EVSE, one or more EV operator-specific parameters that are specific to an EV operator, wherein the one or more EV operator-specific parameters affect charging service for the EV at the EVSE, wherein the one or more EV operator-specific parameters are received automatically as a result of the EV being connected to the EVSE, and wherein the one or more EV operator-specific parameters includes pricing parameters for the charging service; and
   applying the one or more EV operator-specific parameters to affect the charging service for the EV at the EVSE, wherein applying the one or more EV operator-specific parameters includes the following:
      determining, from the pricing parameters, a rate the EV operator is willing to pay for the charging service.

16. The non-transitory computer-readable storage medium of claim 15, wherein the rate the EV operator is willing to pay for the charging service is determined based at least on one of the following: a location of the EVSE, a time of the charging service, and a day of the charging service.

17. The non-transitory computer-readable storage medium of claim 15, wherein the pricing parameters include charging plans based on classes of sites of the EVSE and times of day.

18. The non-transitory computer-readable storage medium of claim 15, wherein the rate the EV operator is willing to pay is an amount per mile, an amount per unit of electrical energy, an amount for a particular miles range, or an amount for a specified percentage of battery charge.

19. The non-transitory computer-readable storage medium of claim 15, wherein the one or more EV operator-specific parameters are received from the EV over a communication link that is wired.

20. The non-transitory computer-readable storage medium of claim 19, wherein the communication link is across a charging cable that couples the EV and the EVSE.

21. The non-transitory computer-readable storage medium of claim 15, wherein the one or more EV operator-specific parameters are received from the EV over a communication link that is wireless.

\* \* \* \* \*